S. Z. DE FERRANTI.
FLUID CONTROLLING AND METERING DEVICE.
APPLICATION FILED APR. 2, 1907.

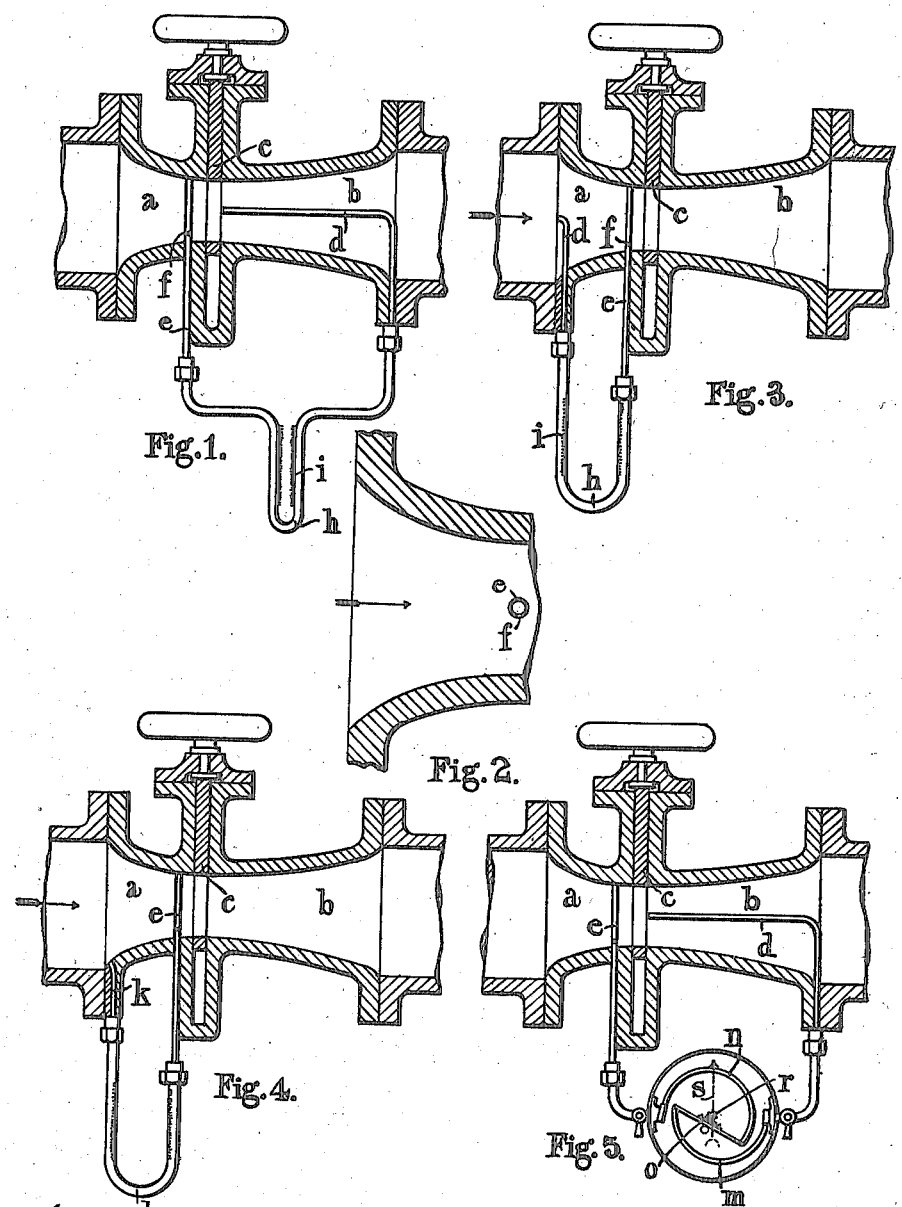

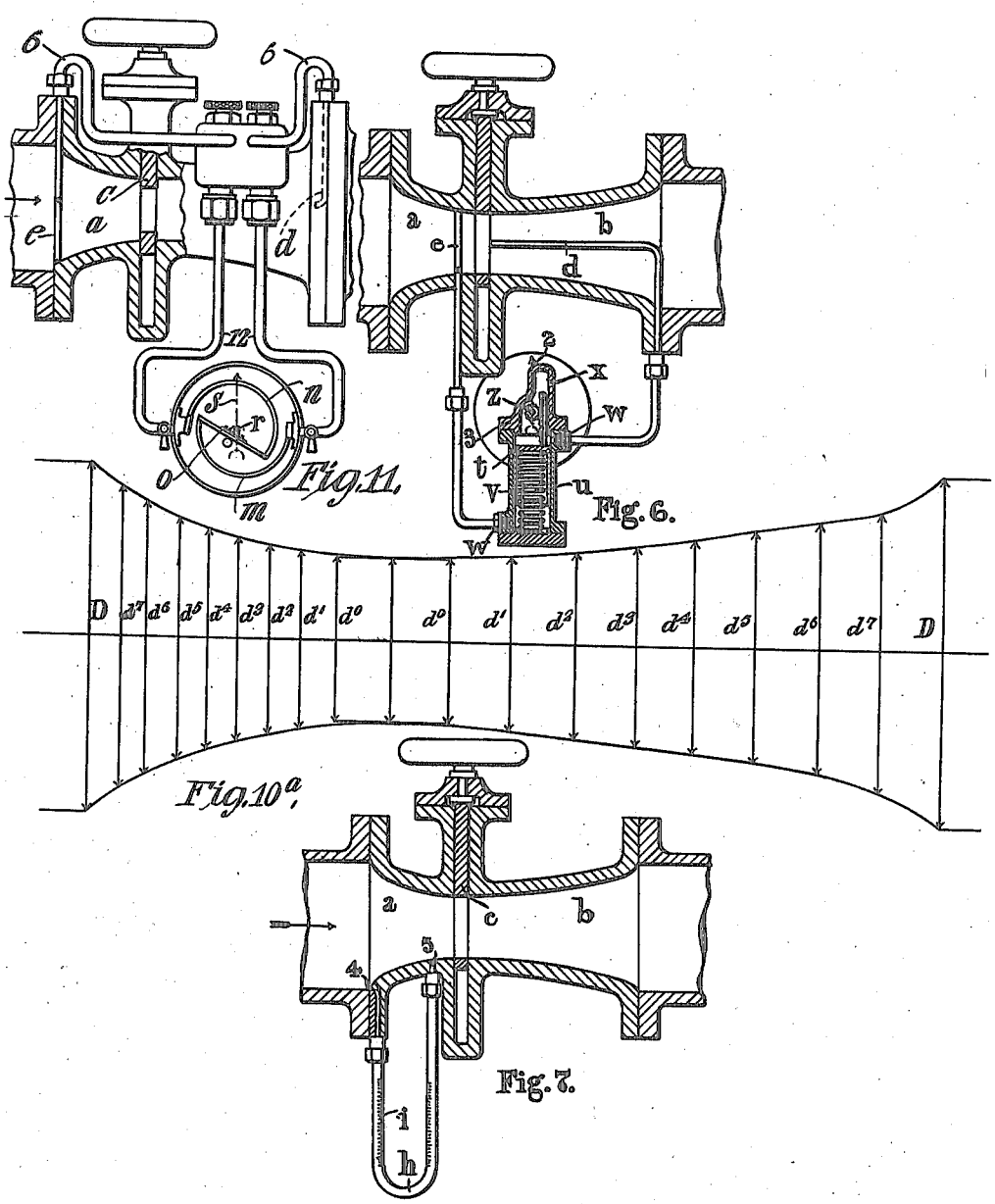

1,249,601.

Patented Dec. 11, 1917.
3 SHEETS—SHEET 3.

UNITED STATES PATENT OFFICE.

SEBASTIAN ZIANI DE FERRANTI, OF GRINDLEFORD BRIDGE, NEAR SHEFFIELD, ENGLAND.

FLUID CONTROLLING AND METERING DEVICE.

1,249,601.        Specification of Letters Patent.      Patented Dec. 11, 1917.

Application filed April 2, 1907. Serial No. 365,999.

*To all whom it may concern:*

Be it known that I, SEBASTIAN ZIANI DE FERRANTI, a subject of the King of Great Britain and Ireland, and residing at Grindleford Bridge, near Sheffield, in the county of York, England, have invented certain new and useful Improvements in and Relating to Fluid Controlling and Metering Devices, of which the following is a specification.

My invention relates broadly to fluid controlling and metering devices and especially to those having converging and diverging nozzles such as are employed for instance in the Venturi meter and in the nozzle valves described in my patent specification No. 842393.

The combination of a converging and a diverging nozzle, such as is referred to above, may be called for convenience a Venturi tube but I wish it to be understood that under this term where used generically in the present specification and in the claims appendant thereto, I intend to include not only a duct composed of two strictly conical frusta having their small ends contiguous or adjacent such as forms part of the well known Venturi meter itself, but any duct the cross section of which diminishes in any other manner to a minimum and then increases so long as it is adapted to fulfil an equivalent function as regards the interconversion of velocity and pressure without substantial losses due to eddy-making distortion or obstruction of the stream lines and the like causes.

The general object of my invention is to combine fluid controlling and metering devices and particularly to improve the working efficiency of devices of the type referred to in which a Venturi tube forms an essential element and in particular to enable the quantity of steam or other fluid passing through my nozzle type valve to be indicated or recorded.

To these ends my invention consists broadly in the combination of a fluid controlling device, such as a valve, with means for measuring or indicating the quantity of fluid passing therethrough, such means being dependent on the change of state of the fluid preferably its drop in pressure, due to passage through the controlling device.

The invention consists more specifically in the combination of a Venturi tube having a fluid controlling device disposed at its restricted portion with means for measuring or indicating the quantity of fluid passing therethrough, such means being dependent on the overall drop of pressure due to passage of the fluid through the Venturi tube.

My invention also consists in the combination of a Venturi tube with an improved metering system adapted to give magnified indications as compared with the Venturi meter itself and comprising the improved reversed Pitot tube to be hereinafter described working in conjunction with either a direct Pitot tube or its equivalent or with a static pressure indicator.

My invention further consists in the combination of what I have called a "nozzle valve" (*i. e.* a Venturi tube having a fluid controlling device, such as a valve, disposed at the restricted portion) with indicating means adapted to show or meter the quantity of fluid passed through the valve.

My invention still further consists in a particular form or contour of Venturi tube in which the rate of conversion of pressure energy into kinetic energy or vice versa is constant per unit of length of the corresponding nozzle, though the rate of conversion is not necessarily the same in each nozzle.

A Venturi tube designed in accordance with the above law has a high efficiency and its use renders possible either a reduction in overall dimensions as compared with forms commonly employed or a less overall pressure drop with a given length of tube.

I have discovered by experiment that a reversed Pitot tube as ordinarily known does not in practice produce substantially the suction effect which might theoretically be expected.

The perforated tube, however, which I have invented and which will be described hereinafter actually produces in practice the suction effects which the forms of reversed Pitot tube heretofore known have been supposed to give.

Referring now to the accompanying drawings which form part of the specification:—

Figure 1 shows a form of the invention in which a direct Pitot tube coöperates with my improved reversed Pitot tube, the orifices of the tubes being disposed in proximity to the nozzle throat, Fig. 2 being a view to an enlarged scale of such a perforated tube in section.

Fig. 3 shows a modified arrangement of direct and reversed Pitot tubes.

Fig. 4 showing another form in which my reversed Pitot tube works in conjunction with a static pressure indicator.

Fig. 5 shows a differential gage of the Bourdon type applied to the device of Fig. 1.

Fig. 6 showing a form of differential piston gage similarly applied.

Figure 8:
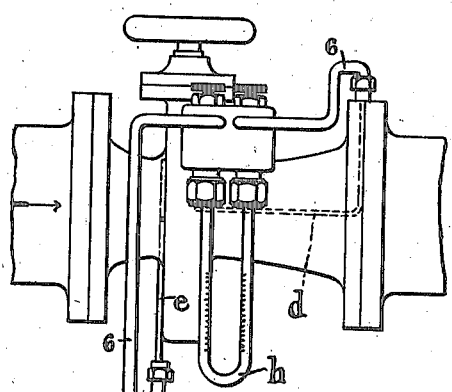
Figure 9:
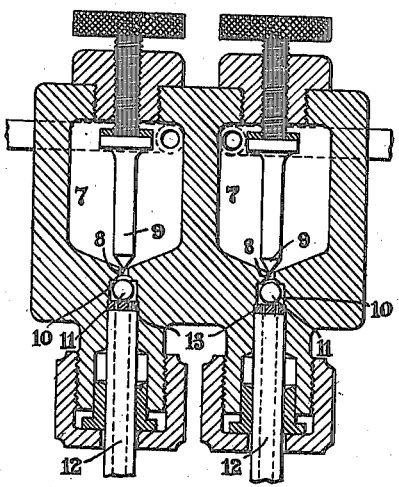

Fig. 7 shows the application of an ordinary two point static pressure indicator to my nozzle valve;

Fig. 8 shows a special method of connecting the Pitot tubes of Fig. 1 to a U-gage, Fig. 9 being a section to an enlarged scale of an automatic valve device used in conjunction therewith.

Figure 10:
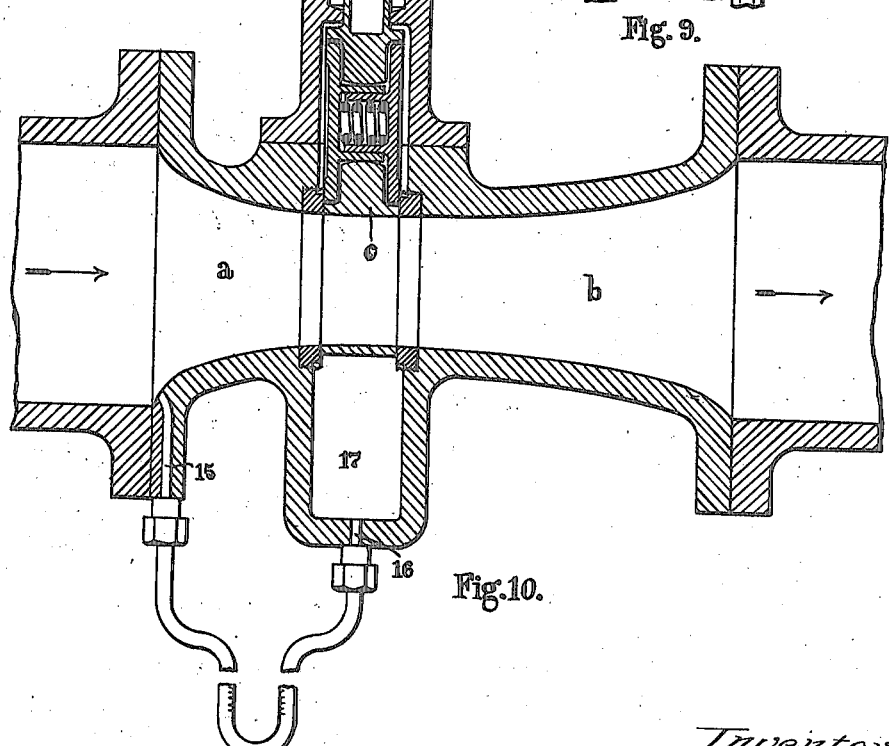

Fig. 10 shows to a larger scale nozzle contours adapted to secure equal energy conversion per unit of their length.

Fig. 10$^a$ is a diagram of a nozzle illustrating the method of determining the internal contour of the same.

Fig. 11 shows a modification of the invention in which the overall pressure drop through the controlling device is utilized for metering purposes.

When desirable the same reference symbols have been used in the different figures to denote corresponding parts.

The drawings are in most cases of a somewhat diagrammatic nature and are not intended to show such working details as are common knowledge to those skilled in the art.

In carrying my invention into effect according to one form (see Fig. 1) I employ a nozzle valve such as is described in my patent specification No. 842393; this valve may be said to consist of a Venturi tube having a converging inlet nozzle, $a$, and a diverging outlet nozzle, $b$, the former of which may be of shorter length than the latter, while the valve proper, $c$, is operatively disposed between the nozzles.

Into the outlet nozzle, $b$, of such a device a Pitot tube, $d$, is inserted preferably from somewhere near the outer end of the nozzle, the open end of the tube being in close proximity to the valve throat and facing upstream.

I also arrange in proximity to the valve throat my improved reversed Pitot tube consisting of a tube $e$, perforated by a small hole, $f$. (See also Fig. 2).

Between these direct and reversed Pitot tubes, $d$ and $e$, respectively is arranged a U-tube, $h$, containing mercury for example, and provided with a suitable scale, $i$, the indications of which enable the quantity of fluid passing to be read directly.

I may of course apply also any of the usual Venturi meter devices for recording or integrating the indications of the gage.

I find that by rotating the tube, $e$, on its own axis a position can readily be found in which the indication of the gage is a maximum; this indication being compounded of the pressure effect due to the direct Pitot tube, $d$, and the suction effect due to my reversed Pitot tube, $e$, is thus magnified in comparison with the indications of the Venturi meter itself.

In the case of an elastic fluid such as steam this arrangement enables me to obtain a reading of about double that of the ordinary Venturi meter while by angular adjustment of the perforated tube, I may secure an indication exactly double that theoretically obtainable with the Venturi meter, when using a two-point static indicator of the type shown in Fig. 5. This magnification I attribute largely to the efficient action of the perforated tube in actually obtaining in practice the suction effect which theory indicated as possible but which is obtained to only a partial extent by the known forms of reversed Pitot tubes.

In the case of inelastic fluids, so far as I am aware, the magnification obtainable is not so large as with elastic fluids.

According to a modification of the invention, (see Fig. 3) instead of placing the Pitot tube, $d$, in proximity to the throat, it may be arranged at about the point where the Venturi tube begins to contract or (see Fig. 4) the indications of the reversed Pitot tube, $e$, may be compared with those of a static pressure indicator, $k$, arranged at any suitable point.

Instead of employing a fluid column gage such as the mercury shown in Fig. 1, for example, I may connect the two Pitot tubes, $d$ and $e$, to two Bourdon gage tubes, $m$ and $n$, (see Fig. 5) the ends of these Bourdon tubes being in turn respectively connected to the link $o$, having a racked portion gearing with a pinion, $r$, carrying the indicating needle, $s$.

Such an arrangement forms a convenient means of obtaining a further magnification of the difference of pressure to be measured.

Or again, I may couple the two Pitot tubes to a differential gage such as that shown in Fig. 6, where a piston, $t$, controlled by the spring, $u$, moves in a cylinder, $v$, provided at its two ends with ports or openings, $w$, connected to the Pitot tubes. The piston, $t$, carries a racked extension, $x$, gearing with the pinion, $z$, of the indicating needle, 2, a suitable cover, 3, inclosing the mechanism as shown.

Although I have described above the use of Pitot tubes in connection with my nozzle valves as the best means known to me of carrying my invention into effect especially when such tubes are disposed near the throat where the velocity is greatest, I nevertheless include the case of an ordinary two-point static pressure indication.

An example of such a form of my invention is shown in Fig. 7, where connections, 4, 5, open without projecting into the nozzle, $a$, in a direction substantially at right angles to the stream lines.

In Figs. 8 and 9, I have shown a special method of attaching the gage tubes so as to prevent the mercury, for instance, being blown out.

In the form shown, the ends of the Pitot tubes, $d$ and $e$, are connected respectively by tubes, 6, to chambers, 7. From the bottom of each of these chambers, a passage, 8, passes which can be opened or closed by a screwed plug, 9. The passage, 8, which is of a comparatively small diameter, leads to a valve chamber, 10, containing a ball valve, 11, and separated from the gage tube, 12, by a perforated washer, 13, as shown. The ball valves, 11, normally rest on their respective washers but in the event of any rush of mercury due, for instance, to a too sudden opening or closing of the main valve, $c$, the appropriate ball will immediately rise and close its passage, 8.

In order to obtain the best efficiency in devices such as I have described employing a Venturi tube, I so graduate the internal contour of the converging and diverging portions that the energy conversion (i. e. the conversion of pressure energy into velocity energy in the receiving nozzle and of velocity energy into pressure energy in the delivery nozzle) is constant per unit of their axial length.

The internal contour of a Venturi tube of the type in question is shown in Fig. 10 applied in conjunction with my nozzle valve to a case where the diameter of the inlet and outlet is twice that of the throat.

Since in any pipe running full, the velocity at a given section varies inversely as the area of the section, i. e. inversely as the square of the diameter in the case of a circular pipe, therefore the square of the velocity varies inversely as the fourth power of the diameter.

The ratio of the squares of the velocities in the full bore of the pipe and at the throat having been thus determined, the proportionate value of the square of the velocity (or the energy) is known at any point of the axial length of the nozzles, since in accordance with the above law, the energy and therefore the square of the velocity varies at a uniform rate.

Hence the fourth power of the diameter at any point is known and the contour of the Venturi tube may then be directly plotted out.

In other terms, the above law for a circular nozzle may be stated as follows:—

The space rate of variation of the reciprocal of the fourth power of the diameter is constant. Referring to that part of the complete Venturi tube occupied by the valve itself, I prefer to find as many points as desired of the contour curve in accordance with the above law between inlet and valve faces and valve face and outlet, assuming for the moment that the passageway through the valve is constant and equal to the diameter of the throat, and finally to run the curves so obtained smoothly into the valve itself so as to obviate anything in the nature of a salient angle.

In Fig. 10$^a$ I have illustrated diagrammatically a nozzle in which the part between the outlet of the nozzle and the parallel part of the throat is divided into eight equal parts as is also the part between said throat and the inlet of the nozzle.

Let
$d_0$ = diameter or width of the nozzle at the throat in the plane of the paper and
$D$ = corresponding dimension at the outlet end of the nozzle;
also let
$$\frac{D}{d_0} = r$$
and
$n$ = number of equal parts into which the nozzle is divided.

If $d_1$, $d$, $d_3$, etc., represent the dimensions of the ordinates bounding the equal parts into which the nozzle is divided the suffixes of which indicate their numerical position reckoning from the throat as zero then if it is desired to find the dimension of any ordinate whose suffix is $p$ it will be given by the formula $$d_p = D \sqrt[4]{\frac{1}{r^4 - \frac{p(r^4-1)}{n}}}$$

The shape of the nozzle may not necessarily be circular; so long as the cross-section throughout is similar the homologous dimensions will be obtained by the above formula.

If $n=8$ and the nozzle is circular with $r=2$ then the following values will be found for the ordinates $d_1$, $d_2$, etc. from the above formula in terms of the diameter of the outlet.

$d_0 = .5D$
$d_1 = .5158D$
$d_2 = .5345D$
$d_3 = .5572D$
$d_4 = .5857D$
$d_5 = .6233D$
$d_6 = .6774D$
$d_7 = .768D$

The ordinates may now be set out with the above proportions and the ends thereof joined by a smooth curve to the center line of the valve the contour of the nozzles so obtained effecting equal conversion of energy per unit length.

In connection with Fig. 10, I have shown another modification of my invention, the tubes, 15 and 16, to the gage, $h$, being connected respectively to a point near the inlet of the nozzle, $a$, and to the valve chest, 17, sufficient leakage taking place at the throat into the valve chest to give the necessary indication.

Although I have described and shown certain gages by way of example applied to certain only of my improved metering systems, it will nevertheless be obvious that such gages or any others that are suitable may be applied to any of my improved metering systems and that other departures may be made from the strict text of this specification without exceeding the ambit of my invention.

Although I have described certain forms of my invention by way of example, I wish it to be understood that in some cases, instead of measuring the drop of pressure from full bore to throat or from throat to full bore, for instance, I may measure the overall pressure drop from full bore to full bore due to the inefficiency of the whole device as shown in Fig. 11, the reference symbols being used as in previous figures. In this figure the perforated tube, $e$, and the Pitot tube, $d$, are disposed one on each side of the contracted portion of the Venturi tube at about the points of maximum cross sectional area of the tube. The difference of pressure indicated is thus due to the inefficiency of the device taken as a whole and this I may in certain cases increase by making the aperture through the valve proper, $c$, of a smaller area than that of the contracted portion of the Venturi tube.

Having now described my invention what I claim as new and desire to secure by Letters Patent is:—

1. A Venturi tube having a passage way of similar cross section throughout, the homologous dimensions of the cross section being calculated from the formula $$dp = D \sqrt[4]{\dfrac{1}{r^4 - \dfrac{p(r^4-1)}{n}}}$$

where $d_0$ = diameter or width of the nozzle at the throat;
$D$ = corresponding dimension at the outlet end of the nozzle;
$\dfrac{D}{d_0} = r;$
$n$ = (number of equal parts into which the nozzle is divided between the parallel portions at the throat and the outlet or inlet of the nozzle);
$d_1 \, d_2 \ldots dp$ = diameter or width at the ordinates bounding the equal parts;

substantially as described and illustrated.

2. The combination of a Venturi tube having an operable fluid controlling device disposed at the contracted portion thereof with means for indicating the quantity of fluid passing therethrough such means including a two-point static pressure indicating device having a perforated tube at one of said points disposed with the axis of the perforation oblique to the stream lines of said passing fluid.

In testimony whereof, I affix my signature in presence of two witnesses.

SEBASTIAN ZIANI DE FERRANTI.

Witnesses:
HENRY H. CREMING,
BERTRAM H. MATTHEWS.